March 26, 1968  KIYOSHI MURAMORI ET AL  3,375,196
METHOD FOR INTRODUCING CALCIUM OXIDE INTO MANGANESE-ZINC
FERRITE MAGNETIC MATERIALS
Filed Feb. 2, 1965
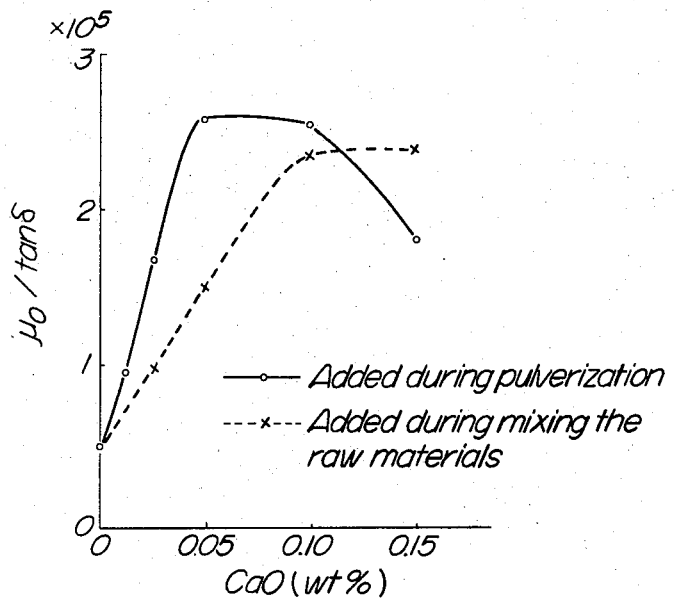
INVENTORS
KIYOSHI MURAMORI
KOICHI YAGUCHI
KATSUMI WATANABE
HIDEO ABE
BY Paul M. Craig, Jr.
ATTORNEY 3,375,196
METHOD FOR INTRODUCING CALCIUM OXIDE INTO MANGANESE-ZINC FERRITE MAGNETIC MATERIALS Kiyoshi Muramori, Koichi Yaguchi and Katsumi Watanabe, Yokohama, and Hideo Abe, Yokosuka-shi, Japan, assignors to Hitachi, Ltd., Tokyo, Japan, a corporation of Japan
Filed Feb. 2, 1965, Ser. No. 429,727
Claims priority, application Japan, Feb. 5, 1964, 39/5,741
9 Claims. (Cl. 252—62.63)

ABSTRACT OF THE DISCLOSURE

The present disclosure relates to a method for producing a manganese-zinc ferrite magnetic material which comprises preparing a mixture of manganese-zinc ferrite-forming raw materials, subjecting the mixture to preliminary firing so that at least a portion of the mixture is crystallized in the form of ferrite, adding a calcium salt in an amount of about .01 to .1% by weight of the mixture, pulverizing the fired mixture, molding the pulverized mixture and sintering the molded body. According to the present disclosure the calcium salt additive is added after a mixture of raw materials has been subjected to preliminary firing to properly transform the mixture into ferrite, so that the major portion of the additive is precipitated at the grain boundaries of the crystals.

---

The present invention relates to a method of producing a magnetic material and more particularly to an improvement in the method of producing a manganese-zinc ferrite magnetic material.

Manganese-zinc ferrite is known as a material which shows a high permeability in a high frequency zone and is presently widely used as a magnetic core material for incorporation in electrical communication equipment of various types. However, this material has been defective in that it shows a relatively large magnetic core loss in a high frequency zone due to its relatively small electrical resistance. A method heretofore known in the art to improve the above-described defect comprises adding a small amount of calcium oxide to this magnetic material and this method has been quite effective to greatly improve the magnetic core loss characteristic of the manganese-zinc ferrite.

The primary object of the present invention is to provide an improvement in the method, as described above, of producing a manganese-zinc ferrite magnetic material. According to the inventive method, addition of an extremely small amount of calcium oxide which is so little as to exhibit any appreciable effect of improvement with the prior method can attain a marked effect of improvement in the magnetic core loss characteristic of the ferrite magnetic material.

Generally, the process of producing a manganese-zinc ferrite magnetic material comprises the steps of preparing a mixture of manganese-zinc ferrite-forming materials, preliminary firing, pulverizing, pressing and sintering. In the prior method of producing the manganese-zinc ferrite magnetic material by the addition of a small amount of calcium oxide, calcium oxide is added in the step of preparing the mixture of raw materials or a raw material in which calcium oxide has previously been mixed by a suitable chemical operation is used in order that calcium oxide can uniformly be distributed in the magnetic material. According to the results of extensive experiments made by the inventors, it has been discovered that, by adding calcium oxide in the step after the step of preliminary firing and by suitably selecting the conditions of preliminary firing, the effect of improvement in the magnetic core loss characteristic by the addition of a small amount of calcium oxide becomes more marked than with the prior method in which calcium oxide is added in the step prior to the step of preliminary firing.

According to the present invention, there is provided a method of producing a manganese-zinc ferrite magnetic material comprising the steps of preparing a mixture of manganese-zinc ferrite-forming raw materials, subjecting the mixture to preliminary firing so that at least a portion of the mixture is crystallized in the form of ferrite, pulverizing the fired mixture, molding the pulverized mixture and sintering the molded body, characterized in that a calcium salt in an amount from 0.01 to 0.10% by weight of the mixture is added to the mixture in the step after said step of preliminary firing.

Other objects and advantages of the present invention will become obvious as the description further proceeds.

In the accompanying drawing, FIG. 1 is a graphic representation of a relation between the reciprocal of a coefficient of magnetic core loss, $\mu_0/\tan \delta$, and an amount of addition of calcium oxide in the manganese-zinc ferrite magnetic material in which the curve in dotted line represents a case with the method of the present invention and the curve in solid line a case with the prior method.

A preferred embodiment of the present invention will now be described in detail hereinunder. Ferric oxide $$(Fe_2O_3)$$

manganese carbonate ($MnCO_3$) and zinc oxide (ZnO) of high purity almost free from a calcium impurity were weighed in molar percentages of 52.0%, 27.0% and 21.0%, respectively, and were thoroughly mixed for 10 hours in a steel ball mill. Then, the mixture of these materials was subjected to preliminary firing in air at a temperature of 800° C. for 2 hours. The fired mixture was again placed in the ball mill and was subjected to pulverization for 20 hours. The pulverized mixture was then sintered in an atmosphere of nitrogen gas including a slight amount of oxygen therein at a temperature of 1250° C. for 3 hours to obtain samples of annularly shaped ferrite. Three samples were selected for the measurement of their initial permeability ($\mu_0$) and coefficient of magnetic core loss (tan $\delta/\mu_0$) at 100 kilocycles. The results are as shown in Table 1.

TABLE 1

| Sample | $\mu_0$ | Tan $\delta/\mu_0$ |
|---|---|---|
| A | 2,470 | $24 \times 10^{-6}$ |
| B | 2,450 | $20 \times 10^{-6}$ |
| C | 2,400 | $18 \times 10^{-6}$ |

In the above table, the sample B includes therein 0.025% by weight calcium oxide (CaO) which was added during the step of preparation of the mixture of raw materials, while calcium oxide in the same amount was added to the sample C during the step of pulverization of the fired mixture. The purpose of Table 1 is to compare the samples B and C with the sample A to which no calcium oxide is added. From Table 1, it will be known that, as far as the samples are subjected to preliminary firing for 2 hours at 800° C., the effect of improvement of the magnetic core loss characteristic by the addition of 0.025% by weight calcium oxide is not marked and the addition thereof in the different steps does not provide any marked advantage.

In the next experiment, the samples were made under the same manufacturing steps with those of the previous case except that the temperature of preliminary firing was varied to 900° C. and 1000° C. The characteristics of the samples so treated as shown in Table 2.

TABLE 2

| Sample | $\mu_0$ | Tan $\delta/\mu_0$ | $\mu_0$ | Tan $\delta/\mu_0$ |
|---|---|---|---|---|
| A | 2,470 | 23×10⁻⁶ | 2,460 | 20×10⁻⁶ |
| B | 2,410 | 16×10⁻⁶ | 2,300 | 10×10⁻⁶ |
| C | 2,280 | 13×10⁻⁶ | 2,000 | 6×10⁻⁶ |
| Temp. of preliminary firing, °C | | 900 | | 1,000 |

From Table 2, it will be known that the effect of improvement of the magnetic core loss characteristic depending on the different methods of calcium oxide addition becomes more marked as the temperature of preliminary firing becomes higher and it will be apparent that the more excellent of the two methods is the method in which calcium oxide is added during the step of pulverization of the fired mixture.

The fact that the effect of improvement of the magnetic core loss characteristic by the addition of calcium oxide varies widely depending upon the method of addition thereof will also be apparent from FIG. 1 which illustrates variation of the magnetic core loss characteristic with relation to an amount of addition of calcium oxide in percent by weight in different methods of calcium oxide addition. The samples in this case were made under the entirely same manufacturing conditions with the previous case except that they were subjected to preliminary firing at a temperature of 1000° C. In FIG. 1, the relation between the reciprocal of the coefficient of magnetic core loss, $\mu_0/\tan \delta$, and an amount of calcium addition in the sample obtained by one of the methods is compared with that of the sample obtained by the other method of calcium oxide addition. From FIG. 1, it will be known that the method of the present invention in which calcium oxide is added during the step of pulverization of the fired mixture is far more excellent than the priorly known method of adding calcium oxide during the step of mixing the ferrite-forming material in that the inventive method with the addition of calcium oxide of a far less amount than with the prior method can provide a magnetic material of improved magnetic core loss characteristic over that of a priorly known material.

Excellency of the method according to the present invention does not vary by a different composition of raw materials forming the manganeze-zinc ferrite. This will be apparent from the following experiment made by the inventors. Ferric oxide, manganese carbonate and zinc oxide were mixed in molar percentages of, for example, 52.5%, 27.0% and 20.5%, respectively, and the mixture was subjected to preliminary firing at a temperature of 980° C. Then, according to the method of the present invention, 0.045% by weight calcium oxide was added to the mixture during the step of pulverization of the fired mixture and the pulverized mixture was sintered in an atmosphere of nitrogen gas including therein a slight amount of oxygen at a temperature of 1225° C. for 3 hours to obtain a sample of annularly shaped ferrite. The sample thus obtained showed an excellent coefficient of magnetic core loss of tan $\delta/\mu_0=2.5\times10^{-6}$. The prominent effect of the present invention will be substantially the same when a calcium salt such as calcium carbonate which turns into calcium oxide at high temperatures may be used in lieu of calcium oxide.

The method according to the present invention is characterized by the addition of a calcium salt during a step after the step of preliminary firing of the ferrite-forming mixture and in this case it is absolutely necessary that at least a portion of the ferrite-forming mixture is crystallized into the spinel structure when subjected to preliminary firing. Therefore, the effect of improvement of the magnetic core loss characteristic by the method of the present invention becomes more marked as a temperature of preliminary firing becomes higher as shown in Table 2. In this case, however, an increased temperature of preliminary firing results in a reduction in the initial permeability of the ferrite. Therefore, there is a limited temperature range of preliminary firing in order to obtain a minimum value of the coefficient of magnetic core loss. The optimum conditions for the preliminary firing vary widely depending on a chemical activity of ferrite-forming materials employed or a chemical activity of an additive added during the step of preparing the mixture of ferrite-forming materials. Thus, it is difficult to determine a definite temperature which is optimum for the preliminary firing. For example, in the method of producing the ferrite magnetic material represented by Table 1 in which a prominent effect could not be obtained, goethite $$FeO \cdot OH \text{ or } (FE_2O_3H_2O)$$

may be used in place of ferric oxide and vanadium oxide ($V_2O_5$) in an amount of 0.15% may be added during the mixing of ferrite-forming materials, then the mixture being sintered at a temperature of 1260° C. In the above producing steps, calcium oxide is added during the step of preparing the ferrite-forming mixture and during the step of pulverizing the fired mixture to compare the characteristics of samples obtained by the different steps of addition of calcium oxide. The samples showed the characteristics as shown in Table 3.

In Table 3, the sample D represents the one to which calcium oxide is added during the step of preparing the ferrite-forming mixture, and the sample E represents the one to which calcium oxide is added during the step of pulverizing the fired mixture.

TABLE 3

| Sample | $\mu_0$ | Tan $\delta/\mu_0$ |
|---|---|---|
| D | 2,410 | 8.5×10⁻⁶ |
| E | 2,280 | 4.8×10⁻⁶ |

From the above table, it will be known that the sample E to which calcium oxide is added during the step of pulverizing the fired mixture according to the inventive method is remarkably excellent in its magnetic core loss characteristic over the sample D.

What is claimed is:

1. A method for producing a manganese-zinc ferrite magnetic material which comprises preparing a mixture of manganese-zinc ferrite-forming raw materials, subjecting the mixture to preliminary firing so that at least a portion of the mixture is crystallized in the form of ferrite, said preliminary firing being conducted at a temperature range sufficient to obtain a minimum value of the coefficient of magnetic core loss, adding a calcium salt in an amount of about .01 to .1% by weight of the mixture, pulverizing the fired mixture, molding the pulverized mixture and sintering the molded body.

2. A method of producing a manganese-zinc ferrite magnetic material according to claim 1, wherein the calcium salt is calcium carbonate which readily decomposes at high temperatures to form calcium oxide.

3. The method of producing a manganese-zinc ferrite magnetic material according to claim 1, wherein the calcium salt is calcium oxide which is present in an amount of about 0.01 to less than about 0.05% by weight.

4. A method of producing the manganese-zinc ferrite magnetic material according to claim 1 wherein the calcium salt is added to the mixture during the step of pulverizing the fired mixture.

5. The method of producing a manganese-zinc ferrite magnetic material according to claim 4, wherein the calcium salt is calcium oxide which is present in an amount of about 0.01 to less than about 0.05% by weight.

6. The method of producing a manganese-zinc ferrite magnetic material according to claim 4, wherein the calcium salt is calcium carbonate which readily decomposes at high temperatures to form calcium oxide.

7. A method for producing a manganese-zinc ferrite magnetic material which comprises preparing a mixture of manganese-zinc ferrite-forming raw materials, subjecting the mixture to preliminary firing at a temperature of about 800° C. to 1000° C., adding calcium oxide in an amount of about 0.01 to less than about 0.05% by weight of the mixture, pulverizing the fired mixture, molding the pulverized mixture and sintering the molded body.

8. A method of claim 7 wherein the preliminary firing is conducted at a temperature of about 900° to 1000° C.

9. The method of claim 7 wherein the calcium oxide is added to the mixture during the step of pulverizing the fired mixture.

References Cited
UNITED STATES PATENTS

| | | | |
|---|---|---|---|
| 2,736,708 | 2/1956 | Crowley et al. | 252—62.5 |
| 2,837,483 | 6/1958 | Hakker et al. | 252—62.5 |
| 2,903,429 | 9/1959 | Guillaud | 252—62.5 |
| 3,106,534 | 10/1963 | Akashi et al. | 252—62.5 |

TOBIAS E. LEVOW, *Primary Examiner.*

ROBERT D. EDMONDS, *Examiner.*